United States Patent [19]
Wilson

[11] 3,802,602
[45] Apr. 9, 1974

[54] VEHICULAR AIR CUSHION IMPACT ABSORBING SYSTEM

[76] Inventor: Freddie W. Wilson, 580 College Pky., Apt. 104, Rockville, Md. 20850

[22] Filed: Jan. 28, 1972

[21] Appl. No.: 221,597

[52] U.S. Cl.............. 244/100 R, 180/121, 180/128
[51] Int. Cl............................................... B60v 3/08
[58] Field of Search.......... 244/100 R, 138 R, 12 R; 180/116–130; 114/67 A, 67 R

[56] References Cited
UNITED STATES PATENTS

| | | | |
|---|---|---|---|
| 3,240,282 | 3/1966 | Taylor | 180/128 |
| 3,268,021 | 8/1966 | Jones et al. | 180/128 |
| 3,438,457 | 4/1969 | Guienne et al. | 180/128 X |
| 3,332,508 | 7/1967 | Bertin et al. | 180/121 |
| 3,285,356 | 11/1966 | Cockerell | 180/127 |
| 3,275,270 | 9/1966 | Earl et al. | 180/116 X |
| 3,572,461 | 3/1971 | Bertin et al. | 180/121 X |

FOREIGN PATENTS OR APPLICATIONS
1,208,870  10/1970  Great Britain...................... 180/127

Primary Examiner—Milton Buchler
Assistant Examiner—Paul E. Sauberer
Attorney, Agent, or Firm—J. Gibson Semmes; Charles E. Snee, III

[57] ABSTRACT

Air Cushion Impact Absorbing System and apparatus for vehicles, especially adaptable for an air cushion aircraft landing gear system to absorb high energy impact forces, also applicable to conventional air cushion vehicles where impact absorption is necessary. An open-ended preferably conical shaped flexible outer air cushion cell is used in conjunction with a pressurized, closed end, flexible inner conical air cushion cell, with appropriate air flow and pressurizing control for high efficiency operation.

14 Claims, 6 Drawing Figures

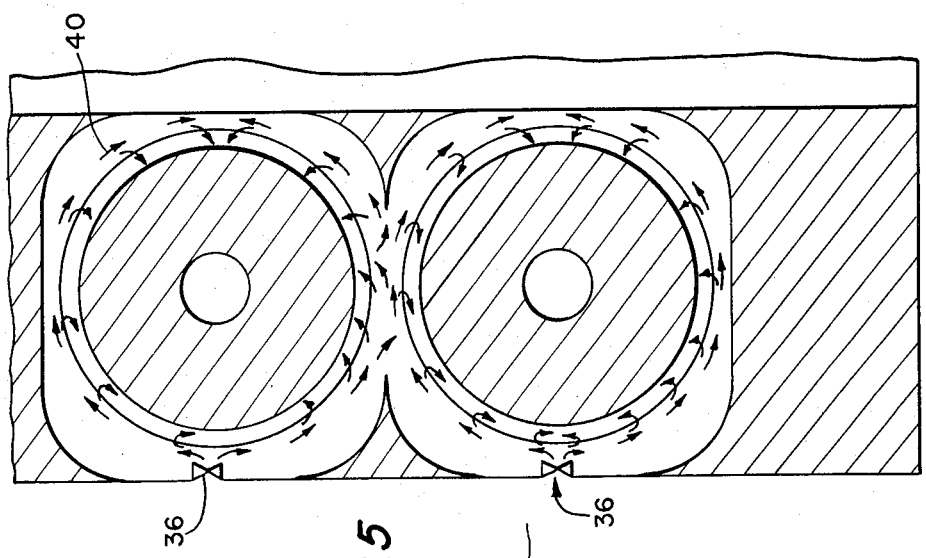
FIG. 5
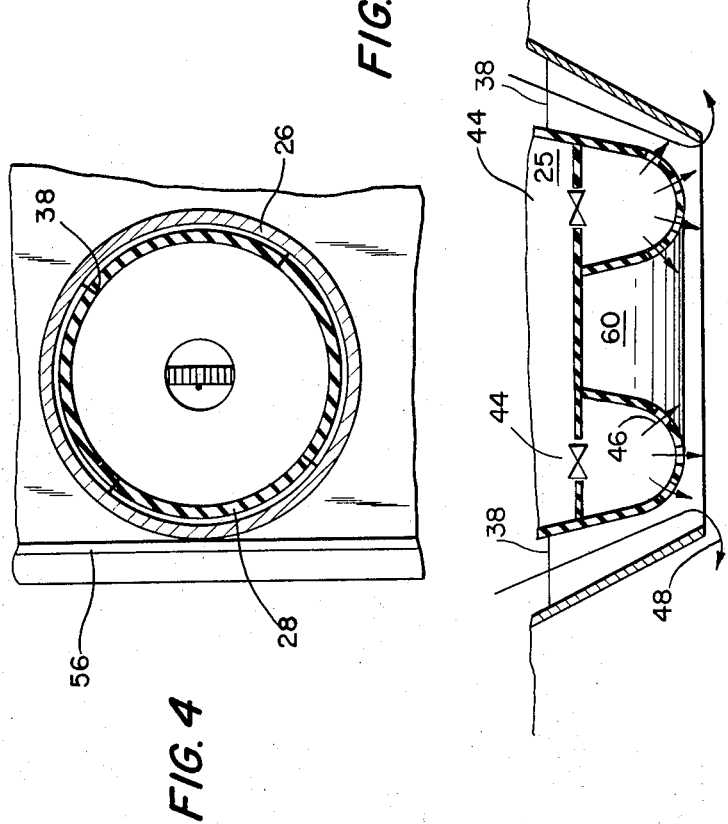
FIG. 4
FIG. 6

VEHICULAR AIR CUSHION IMPACT ABSORBING SYSTEM

BACKGROUND OF THE INVENTION

Recently there has been increased interest in the use of air cushion systems for vehicles where impact absorption is necessary, particularly with reference to the use of air cushion systems for aircraft landing gear. A need exists for a landing gear system for aircraft which is capable of supporting the aircraft during landing and takeoff phases of flight on irregular and unprepared surfaces. This need has been existent in the small aircraft field for a period of time but has received added emphasis in the past several years due to the airstrip facility condition encountered in military operations for example in remote geographical areas. Another reason for the increased interest resides in the arrival of the jumbo jet transports and the accompanying large concentrated loads applied to both aircraft and airstrip during landing.

While conventional air cushion systems have known properties which lend to a solution of the problem, a practical construction has not heretofore been available. An air cushion landing gear (ACLG) could provide a solution to the problems existing. It can operate over irregular surfaces on a stratum of air and therefore distribute the landing loads over a much larger area, thus requiring less structural strength in the aircraft and load bearing capacity of the landing strip.

A major problem facing the successful development of an air cushion landing gear, however, is that it must compete with conventional wheel-landing gears. This is a difficult accomplishment because it must statically and dynamically support landing and takeoff loads with less system weight, drag and horsepower requirement than does a system which for an extended period in the past has accomplished the job in a relatively simple and economic way. While efficiency of the wheel-landing gear type system is difficult to surpass, the air cushion system has an area of application which can at present be fulfilled by no other means. Its success then is a function of how efficiently the system may be designed.

Previous efforts to use an air cushion landing system include a Bell Aero System which is currently operational. The concept of this Bell Aero System allows aircraft to operate off of a stratum of air instead of wheels. It consists of a large elongated rubber trunk which encircles the aircraft fuselage providing an air duct and seal for the air cushion. The bottom of the trunk is perforated with holes where air escapes and maintains an air cushion which theoretically eliminates ground to trunk friction. This landing system in effect is a slight extension of technology developed for a British type of air cushion or hovercraft vehicle and has undergone model tests. The tests indicated that the system possessed adequate roll and pitch stiffness to allow take off rotation and landing at high degrees of roll and pitch. Vertical energy absorption also was demonstrated. This system referred to as ACLS has been flight tested on light aircraft (2,500 lbs.) and the tests showed successful takeoff and landing from concrete, asphalt, rough grass, snow and water. Taxi tests over plowed ground, mud, stumps, and ditches proved successful and energy absorption and braking of the system were good.

This existing ACLS system however has certain drawbacks. Required pressure inside the inflated trunk is excessive, requiring power on the order of 20 to 40 percent of the total propulsive power of the aircraft. This results from the same mechanism being used for both dynamic energy absorption needed primarily for landing and the static load carrying system used only during taxi. It therefore results in an excessive pressure requirement being available at all times, even when not needed, plus a resulting excessive flow rate and excessive power requirement. This system also has ground clearance limitations since for large ground clearances the size of the trunk or torus used must be very substantial.

The present invention teaches an air cushion landing system which overcomes the drawbacks of the known systems and provides a desirable and practical system.

BRIEF SUMMARY OF THE INVENTION AND DESCRIPTION OF DRAWINGS

The present invention provides an air cushion system and apparatus for vehicles especially usable as an air cushion aircraft landing gear system (ACLG) which is capable of supporting aircraft during landing and take-off on irregular and unprepared surfaces. It operates over irregular surfaces on a stratum of air and therefore distributes its landing loads over a much larger area. It thus requires comparatively less structural strength for the aircraft and the landing strip.

In accomplishing these purposes a basic open-ended, conical-shaped, flexible outer air cushion cell is used in conjunction with a pressurized, closed-ended, flexible, inner conical air cushion cell to absorb impacts which are of relatively high energy. While open-ended, conical-shaped, flexible outer air cushion cells have been used in air cushion vehicle systems, the use of an outer cell in conjunction with an inner cell in accordance with this invention is a new concept. In operation the invention proximates a flexible annular jet type of system wherein air is pumped between an inner and outer wall passageway, where its static pressure is increased by constricting the exit area of the passageway. The air is then exited at a particular angle to the ground surface. This ground angle is determined by the cone angles of the cells and as designed offers a higher efficiency system over smooth ground than does an open plenum system.

Additional and further objects and advantages of the invention will be more readily apparent from the following detailed description of an embodiment thereof when taken together with the accompanying drawings in which:

FIG. 4 is a fragmentary sectional view taken on line 4—4 of FIG. 3;

FIG. 5 is a fragmentary sectional view taken on line 5—5 of FIG. 3; and

FIG. 6 is a schematic fragmentary view of a single composite cell and valve system therefor.

DESCRIPTION OF THE PREFERRED EMBODIMENTS

Figure 1:
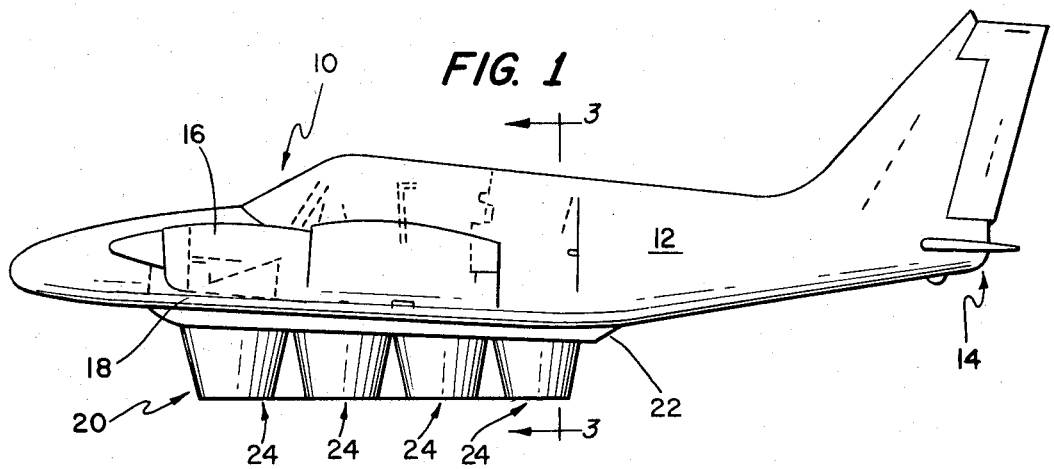
FIG. 1 is a schematic side elevational view of an aircraft with the landing gear system of the invention associated therewith.

Referring now in more detail, in FIG. 1 the schematic aircraft designated 10 includes the usual fuselage 12, empennage 14, motors 16 and conventional fixed wings, generally indicated at 18. The air cushion landing gear of the invention is indicated at 20, mounted below the fuselage 10 in an area or location of normal balanced placement of a wheeled landing gear system.

The air cushion landing gear (ACLG) of the invention may include a mounting platform or base 22, secured to the underside of fuselage 12 and which mounts a plurality of air cushion cells designated 24 as a spaced array thereof. In the design shown this consists of eight cells arranged in a longitudinal array of four transversely disposed cells. The number and location of cells will be varied according to the vehicle or aircraft to which attached. Obviously a similar base 22 or foundation may comprise an integral interior portion of the fuselage or air frame.

Figure 2:
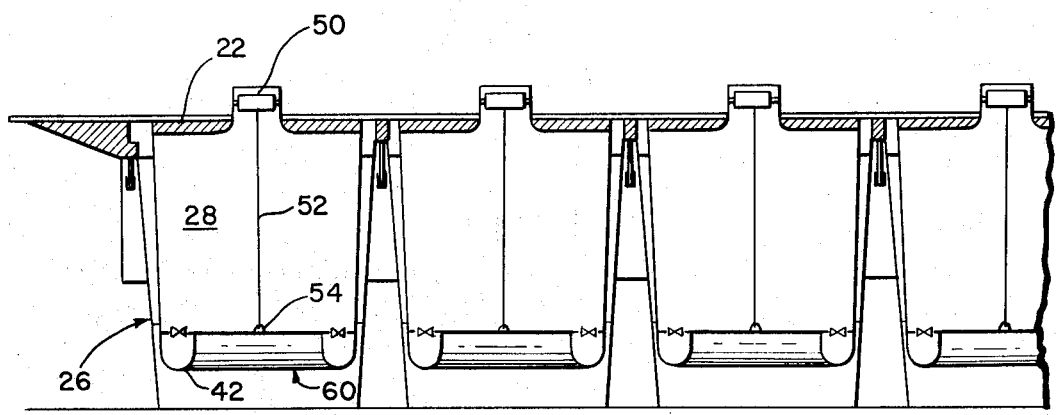
FIG. 2 is an enlarged fragmentary longitudinal sectional view through a portion of the landing system.

As shown in FIG. 2, each of these air cushion cells 24 includes an open-ended, conical-shaped, flexible outer air cushion cell 26 in the nature of a skirt and a pressurized, closed-ended, flexible, inner conical air cushion cell 28 also in the nature of a skirt. The cells are constructed of any suitable material which is flexible, airtight, wear resistant, having sufficient strength and rigidity requirements as will be hereinafter pointed out. Outer air cushion cell constructions, per se, have heretofore been used in air cushioned vehicles. The use of an outer cell with one cone angle in conjunction with an inner cell with a smaller cone angle has not heretofore been known. The invention provides, in effect, a flexible annular jet type of system wherein the cells can remain in a stable mode when operating out of ground effect because the converging passageway defined by the inner and outer cones causes the static pressure inside the passageway to increase. The same configuration operating without pressurized converging passageway and out of ground effect, as when an airplane initially lowers its landing gear, will not deploy properly and will not be stable. Thus, it will flap in the windstream and will be unable to form an air cushion when it finally comes into ground effect.

In operation, air is pumped between the inner and outer coacting cell walls where its velocity is increased and then is exited at a particular angle to the ground surface. This angle is determined by the cone angles of the cells and a proper design offers a highly efficient system over smooth ground with respect to an open plenum system as heretofore used.

Figure 3:
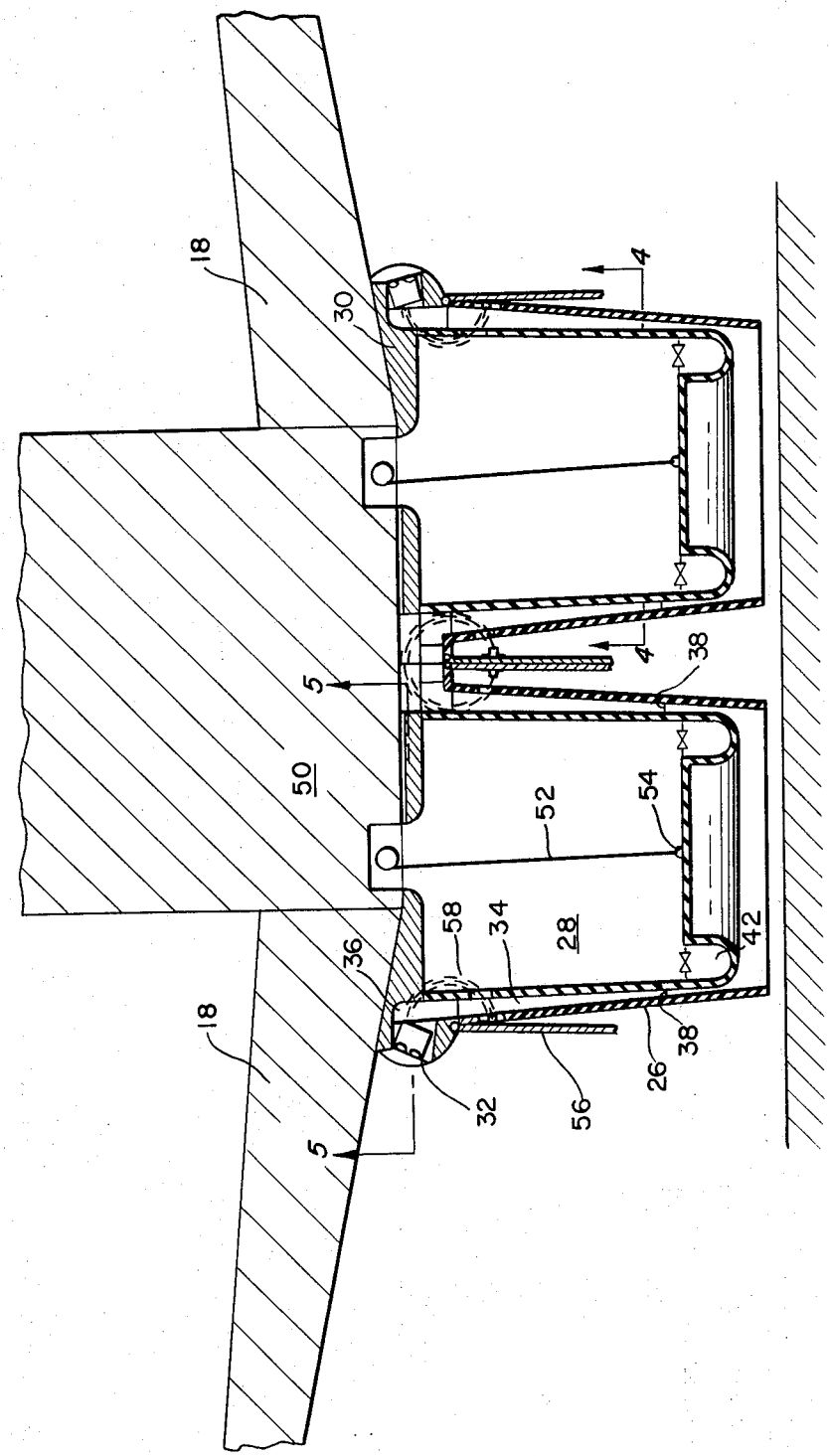
FIG. 3 is a schematic sectional view taken on line 3—3 of FIG. 1.

As shown in FIG. 3 the cell composites are suspended from structure indicated at 30 which should have a loading which is near cushion pressure. A cushion air source of an appropriate type such as fans 32 exhaust air into the annulus 34 between the cells, air intake therefore being generally indicated at 36. With reference to FIGS. 3 and 4, vertical webs 38 are provided in order to insure equal flow around the periphery of the plenum chamber which might otherwise be affected due to forces on an outer cell by movement through the air of the aircraft which would tend to deflect or bend the flexible outer cell. The flow of air is indicated by arrows 40 in FIG. 5.

The inner cells 28 consist of a flexible material such as a rubberized substance and preferably having an inflatable tire-shaped structure 42 at the bottom thereof which can, for example, be formed of material in the nature of a deicing boot. The inner cell is preferably pressurized by valve connection to a small volume of bottled air; otherwise it may be pressurized by means of valvular connection to the main compression source. Air is supplied to the inflatable tire-shaped structure from the inner cell by means of the valve system 44, indicated in FIG. 6. Air vent passages 46 may be provided in structure 42, if desired, to permit passage of lubrication air from the interior of the structure and to permit venting of the inner cell. This valve system 44 not only allows the inner cell to be pressurized with no exhaust flow, if desired, but also provides means to control the venting of the inner cell when desired through structure 42 and air vent passages 46.

The inner cell is adapted to absorb impact forces. The cell in effect has a spring constant and damping coefficient much like a shock absorber, spring force and damping being derived from controlled venting of the inner cell. This venting will, of course, take place during the movement of impact.

Any initial venting prior to surface impact can be actuated by means of some height measuring apparatus of known embodiment such as a barometric altimeter, radar, acoustic altimeter used on present United States Naval hydrofoil boats or any other known apparatus. Further venting can be controlled by an automatic pressure sensing procedure and the air should be exited at the bottom of the inner cell by air vents indicated at 46 where it can serve to lubricate the inner cell. Normal or annular jet air flow from between the inner and outer cells is indicated by arrows at 48 and which peripherally extends.

Provision is made for retracting the skirt which consists of the inner and outer cell structures. This is indicated in FIG. 3 as including a pulley arrangement generally indicated at 50 which can be of any known structure. A cable 52 extends to a connection at 54 with the cell structure. Since the inner and outer cells are attached by several vertical membranes, any retraction of the cables retracts both cells. Landing gear doors at 56 shown in FIG. 3 in the open position can be opened or closed by appropriate mechanism 58. Existing known mechanisms can be used for this purpose. When it is desired to extend the landing gear the doors are opened and the cells or skirt structure forcibly extended into operative position and conversely retracted when not required. Cable 52 may be used in one form of the invention to control retraction and maintenance of the bottom shape of the inner cell.

The use of the outer and inner cells of a generally exterior conical configuration and their relationship one to another controls the exit area of the cushioning flow which can be made small, thus decreasing the flow rate requirement and increasing the internal cell pressure to a point where it can compensate for the forces on these cells due to the free stream dynamic pressures. While the inner cell does not significantly alter the capability of the outer cell, dynamic impact loads occur during landing due to vertical descent velocities and if the outer cell alone were operative it is possible that this would collapse under dynamic load forces which may be greater than normal. The present invention, however, with the composite of the inner and outer cells and with an appropriate design for the pressurized closed end inner conical cell, will possess the equivalent or greater load absorption and damping capability required of a classical wheel type of landing gear.

Operationally, the cells deployed are similar to normal wheel types of landing gears. In landing, as the bottom of the cells approaches the ground a slight air cushion pressure will begin to build up. As the air gap reduces to zero, the pressure in the outer cell will build up to and exceed its design static loading pressure. The ACLG will then begin to collapse because the loads produced by the vertical descent velocities are much greater than the static taxi loads. Also, if the ACLG makes contact with the ground surface obliquely, then the outer cell will vent excessively, and this venting will contribute to the collapse of the outer cell. The rate of descent will, however, start to decrease. When contact is made between the ground surface and the inner cone, the descent rate will decrease rapidly and the descent forces will be taken up by the pressurized spring system designed into the inner cell and damping will begin. During this process air captured between the inner cell and the ground surface augmented by a controlled venting of the inner cell will be forced to exit the cavity under the inner cell forming an air lubricated gap. The air supplied by the controlled venting can be initiated prior to ground contact if necessary. This process is somewhat similar to the manner in which an air bearing operates. In a like manner, successive pairs of cells will operate, although possibly the rear cells will absorb most of the dynamic loads. As the descent rate approaches zero, the collapsed cells will spring back to their original shape, any perturbations will have been damped out, and the aircraft will taxi to a stop.

Appropriate design features are incorporated in the system including ACLG deployment, height to diameter ratio, and static lift capability. The deployment refers to ability of the landing gear to remain deployed when subjected to aerodynamic pressures encountered during the landing and takeoff operations. The height to diameter ratio is the ability of the landing gear to provide adequate clearance between the fuselage and the ground and static lift capabilities refers to static loads encountered by the aircraft during taxi as opposed to dynamic loads which refer to the energies produced by an aircraft having a vertical descent rate during landing. The basic concepts and correlation of these features are variable as applied to different vehicles and operating conditions.

The proper design is such that an increase in velocity between the inner and outer walls causes an increase in the static pressures which the walls see. This pressure increase is a necessary design variable, since it is required to counteract the free stream dynamic pressure which impinges on the cell walls during forward flight. It can be increased or decreased by changing the angle difference between the inner and outer walls which in turn varies the air jet exit area. As previously mentioned the free stream dynamic force due to forward velocity will tend to force the outer cell wall against the inner cell wall and thereby impair jet action of air flow. To counteract this force which redistributes the air around the cell periphery, the vertical flexible webs 38 are attached so that there will be an equal cushion flow around the cell periphery.

It is also to be noted in the configuration shown that a cavity 60 is provided in the lower surface of the inner cell. Functionally, this serves to assist lubricating the inner cone by forcing air captured in the cavity out under the edge of the inner cell although as shown, the inner cell can be vented for this purpose. If the cell makes contact obliquely, the venting arrangement is preferable. Various means can be used for providing the air flow action and different means can be used for retraction of the flexible inner cell structure. Flexibility is of prime importance and speed of retraction to avoid damage of the cell material is desirable with appropriate air venting from the cell. The tube shape used on the bottom of each inner cell is considered highly desirable and/or necessary fro various reasons. It can be inflated or deflated at will thus giving greater ground clearance between the inner cell bottom and the ground. A two part inner cell, i.e., a truncated conical upper part and a tubular lower part may make fabrication easier. With an appropriately elastic material a large range of inflatable heights can be used and several of the cells could be used for braking and differential turn control with the tubes appropriately outfitted with abrasive material.

While a single embodiment of the invention has been shown and described herein, manifestly minor changes in details of construction can be effected within the scope of the invention without departing therefrom as defined in and limited solely by the appended claims.

I claim:

1. An air cushion impact absorbing system for vehicles comprising:
   A. at least one open-ended, conical-shaped, flexible outer air cushion cell having a first cone angle;
   B. at least one pressurized, closed-ended, flexible, inner conical air cushion cell comprising side walls with a second cone angle different from the first and located within said outer cell and further comprising an enclosing lower wall forming an enclosed cushion with the side walls;
   C. an inflatable annular support surface contact member attached to the lower wall of the inner cell;
   D. said inner and outer cells defining therebetween a downwardly convergent air flow passageway chamber having an annular air jet exhaust opening at the bottom, which is adapted to exit air at an angle to a vehicle support surface;
   E. means for controllably introducing air under pressure into said passageway chamber; and
   F. means for pressurizing the inner cell and the inflatable annular member.

2. A system as claimed in claim 1, including a plurality of combined inner and outer cells arranged in a longitudinally and transversely extending array, adapted for suspension from said vehicle.

3. A system as claimed in claim 1 wherein introduction of air is selectively controllable such that velocity of flow is increased between the inner and outer cells for causing an increase in static pressures.

4. A system as claimed in claim 1 in combination with a vehicle, said system being retractably mounted on the under surface of said vehicle and adapted for extension into operative impact absorbing position or retraction to inoperative position within the vehicle.

5. A system as claimed in claim 1 and including means for retracting the inner cell partially relative the outer cell.

6. A system as claimed in claim 5, further including membrane elements joining and extending vertically between the first and second cushion cells in the flow passageway.

7. A system as claimed in claim 1 further including means for venting the inner cell comprising valve means connecting the inner cell to the inflatable annular member and air vent passages through a wall of the inflatable annular member.

8. An air cushion landing gear system adapted for operative attachment to an aircraft comprising:
   A. at least one open-ended, conical-shaped, flexible outer air cushion cell having a first cone angle;
   B. at least one pressurized, closed-ended, flexible, inner conical air cushion cell comprising side walls with a second cone angle different from the first and located within said outer cell and further comprising an enclosing lower wall forming an enclosed cushion with the side walls;
   C. an inflatable annular support surface contact member attached to the lower wall of the inner cell;
   D. said inner and outer cells defining therebetween a downwardly convergent air flow passageway chamber having an annular air jet exhaust opening at the bottom, which is adapted to exit air at an angle to a vehicle support surface;
   E. means for controllably introducing air under pressure into said passageway chamber; and
   F. means for pressurizing the inner cell and the annular tube shaped member.

9. A system as claimed in claim 8, including a plurality of combined inner and outer cells arranged in a longitudinally and transversely extending array, adapted for suspension from said vehicle.

10. A system as claimed in claim 8 wherein introduction of air selectively controllable such that velocity of flow is increased between the inner and outer cells for causing an increase in static pressures.

11. A system as claimed in claim 8 in combination with a vehicle, said system being retractably mounted on the under surface of said vehicle and adapted for extension into operative impact absorbing position or retraction to inoperative position within the vehicle.

12. A system as claimed in claim 8 and including means for retracting the inner cell within the outer cell.

13. A system as claimed in claim 12, further including membrane elements joining and extending vertically between the first and second cushion cells in the flow passageway.

14. A system as claimed in claim 8 further including means for venting the inner cell comprising valve means connecting the inner cell to the inflatable annular member and air vent passages through a wall of the inflatable annular member.

* * * * *